H. A. YEIDER.
DEVICE FOR STARTING EXPLOSIVE ENGINES.
APPLICATION FILED MAR. 18, 1918.

1,288,362.

Patented Dec. 17, 1918.

Witnesses
J. R. Bradford

Inventor
Harry A. Yeider
By Cyrus W. Rice
his Attorney

UNITED STATES PATENT OFFICE.

HARRY A. YEIDER, OF GRAND RAPIDS, MICHIGAN.

DEVICE FOR STARTING EXPLOSIVE-ENGINES.

1,288,362.　　　　　Specification of Letters Patent.　　Patented Dec. 17, 1918.

Application filed March 18, 1918. Serial No. 223,149.

*To all whom it may concern:*

Be it known that I, HARRY A. YEIDER, a citizen of the United States, residing at Grand Rapids, in the county of Kent and State of Michigan, have invented new and useful Improvements in Devices for Starting Explosive-Engines, of which the following is a specification.

The present invention relates to devices for starting explosive engines; and its object is, generally, to provide an improved mechanically operated device of that character; and more particularly, to provide such a device whereby the engine may be started by releasing a spring which has been previously tensioned; and further, to provide such a device whereby the starting clutch members may be automatically thrown into operative engagement by the action of such starting mechanism itself; and further, to provide improved means for tensioning the operating spring of such a device; and further, to provide improved means for releasing the pawl from the ratchet of such tensioning means.

This object is attained by, and the invention finds preferable embodiment in, the structure hereinafter described and illustrated by the accompanying drawings, in which:—

Figure 1:
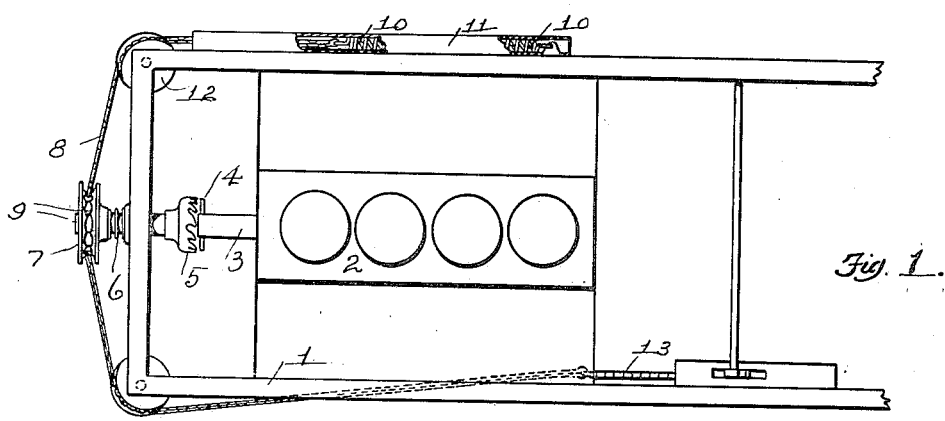
Figure 1 is a plan view of the fore part of the chassis of an automobile having an explosive engine to which my device is applied.
Figure 2:
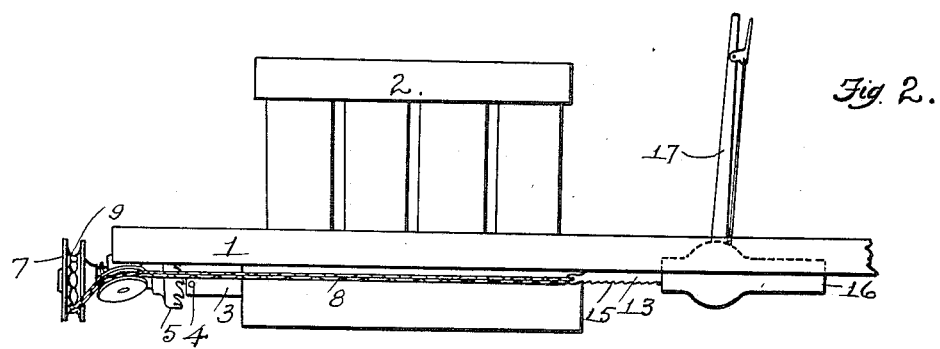
Fig. 2 is a left hand side view of the same.

In the embodiment of the invention chosen for illustration by the drawings and for detailed description in the body of this specification, the automobile 1 has the explosive engine 2. The engine's crank shaft 3 has the clutch member 4 with which coöperates the clutch member 5 to rotate and start the engine, the clutch members being normally held out of engagement by the coil spring 6. The clutch member 5 is provided with a wheel 7 whereby said clutch member is rotated to start or "crank" the engine. A flexible member, as the chain 8, rotatingly engages the wheel on its under side, as by means of the chain's links meshing with the teeth 9 of the wheel. This chain is attached to a strong spring 10 (preferably housed at 11 at one side of the automobile) so that when the spring is tensioned by extending it, and is then permitted to contract, it draws the chain in the direction which rotates the wheel in the starting or cranking movement. This chain is guided between the spring and the wheel, as by passing over the pulley 12, in a line at such an oblique angle to the engine's shaft (as is particularly shown in Fig. 1) as to draw, by the contracting of the spring 10 itself, the wheel and clutch member 5 axially and rearwardly and against the weak spring 6, so that the clutch members operatively engage.

Figure 3:
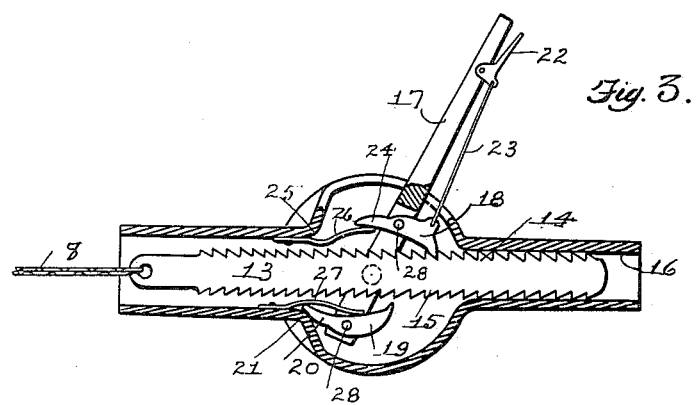
Fig. 3 is an enlarged detail view of means for tensioning the operating spring of said device.

Thus, the clutching is automatic, being effected by the action of the starting means itself. To tension the spring 10 for its operative action, the chain is connected, on that side of the wheel which is opposite to the spring 10 to a suitable ratchet member, as preferably the bar 13 provided with two sets 14, 15 of ratchet teeth, and slidable in a guide 16. The bar is moved to draw the chain and tension the spring 10 by a lever 17 provided with pivotally mounted pawls 18, 19 respectively engaging said sets of teeth. It will be seen that the bar is moved toward the right-hand side of Fig. 3 to tension the spring by the swinging of the lever in either direction. When the spring has been sufficiently tensioned and it is desired to start the engine, (the pawl 19 being in engagement with the teeth 15) the pawl 18 may be released by the handle 22 and connecting rod 23. Then the lever is swung far toward the right-hand side of Fig. 3, and to the position shown in that view. This movement releases the pawl 19 by causing its member 20 to engage and be turned by the fixed lug 21 as shown in Fig. 3. The pawl 18 may be released also by swinging the lever far toward the left-hand side of Fig. 3, causing the pawl's member 24 to engage and be turned by the fixed lug 25, in a manner similar to that whereby the pawl 19 is released. These pawls have springs 26, 27 respectively, mounted in fixed relation to the lever's fulcrum, and so arranged, as shown, as to normally press the pawls into holding engagement with the teeth; but when either pawl is carried by the swinging of the lever nearly to the limit of the pawl's movement toward the left hand side of Fig. 3, the pawl-engaging point of the pawl's spring passes to the opposite side of the pawl's pivotal mounting 28 and therefore urges the pawl away from and out of engagement with the teeth.

The invention being intended to be particularly pointed out in the claims, is not to be limited to or by details of construction shown or described.

I claim:

1. In a device for starting explosive engines; rotatable clutch members for startingly turning the engine's shaft, one of said members being carried by said shaft; a wheel carried by the other clutch member; a flexible element rotatingly engaging the wheel; a spring connected to said element and adapted to draw the same in the direction to startingly turn the engine's shaft; means for drawing said element in the opposite direction to tension the spring; and means for releasing said element from the drawing means.

2. In a device for starting explosive engines; rotatable clutch members for startingly turning the engine's shaft, one of said members being carried by said shaft; a wheel carried by the other clutch member; a flexible element rotatingly engaging the wheel; a spring connected to said element and adapted to draw the same in the direction to startingly turn the engine's shaft; a ratchet-toothed bar connected to said element on the side of the wheel opposite to the spring; a lever having a pawl adapted to engage the teeth of the bar to draw by the swinging of the lever the bar and said element in the direction to tension the spring; and releasable means for holding the bar against return movement.

3. In a device for starting explosive engines; rotatable clutch members for startingly turning the engine's shaft, one of said members being carried by said shaft; a wheel carried by the other clutch member; a flexible element rotatingly engaging the wheel; a spring connected to said element and adapted to draw the same in the direction to startingly turn the engine's shaft; a bar connected to said element on the side of the wheel opposite to the spring and having two sets of ratchet teeth; a lever having pawls adapted to releasably engage said sets respectively and to draw by the swinging of the lever in either direction the bar and said element in the direction to tension the spring.

4. In a device for starting explosive engines; rotatable clutch members for startingly turning the engine's shaft, one of said members being carried by said shaft; a wheel carried by the other clutch member; a flexible element rotatingly engaging the wheel; a spring connected to said element and adapted to draw the same in the direction to startingly turn the engine's shaft; said element being guided between the wheel and the spring at such an oblique angle to the wheel's axis as to draw the clutch members into operative engagement by the spring.

5. In a device for starting explosive engines; rotatable clutch members for startingly turning the engine's shaft, one of said members being carried by said shaft; a wheel carried by the other clutch member; a flexible element rotatingly engaging the wheel; a spring connected to said element and adapted to draw the same in the direction to startingly turn the engine's shaft; said element being guided between the wheel and the spring at such an oblique angle to the wheel's axis as to draw the clutch members into operative engagement by the spring; means for drawing said element in the opposite direction to tension the spring.

6. In a device for starting explosive engines; rotatable clutch members for startingly turning the engine's shaft, one of said members being carried by said shaft; a wheel carried by the other clutch member; a flexible element rotatingly engaging the wheel; a spring connected to said element and adapted to draw the same in the direction to startingly turn the engine's shaft; a fixed lug; a ratchet-toothed bar connected to said element on the side of the wheel opposite to the spring; a lever; a movable pawl carried by the lever and adapted to engage the teeth of the bar to draw by the swinging of the lever the bar and said element in the direction to tension the spring, the pawl having a member adapted to engage the lug in one position of the lever and be moved thereby out of operative engagement with the ratchet teeth.

7. In a device for starting explosive engines; rotatable clutch members for startingly turning the engine's shaft, one of said members being carried by said shaft; a wheel carried by the other clutch member; a flexible element rotatingly engaging the wheel; a spring connected to said element and adapted to draw the same in the direction to startingly turn the engine's shaft; a ratchet-toothed bar connected to said element on the side of the wheel opposite to the spring; a lever; a movable pawl carried by the lever and adapted to engage the teeth of the bar to draw by the swinging of the lever the bar and said element in the direction to tension the spring; a second spring mounted in fixed relation to the lever's fulcrum and adapted to press the pawl into operative engagement with the ratchet teeth in one position of the lever and to press the pawl out of such engagement in another position of the lever.

8. In a device for starting explosive engines; rotatable clutch members for startingly turning the engine's shaft, one of said members being carried by said shaft; a wheel carried by the other clutch member; a flexible element rotatingly engaging the wheel; a spring connected to said element and adapted to draw the same in the direction to startingly turn the engine's shaft; means for tensioning the spring; and means for releasing the spring.

9. In a device for starting explosive engines; rotatable clutch members for startingly turning the engine's shaft, one of said members being carried by said shaft; a wheel carried by the other clutch member; a flexible element rotatingly engaging the wheel; a spring connected to said element and adapted to draw the same in the direction to startingly turn the engine's shaft; a fixed lug; a movable ratchet-toothed member connected to the spring; movable means provided with a releasable pawl adapted to engage the teeth of the ratchet-toothed member to tension the spring by the movement of said movable means; the pawl having a member adapted to engage the lug in one position of said movable means and to be moved thereby out of operative engagement with the teeth.

10. In a device for starting explosive engines; rotatable clutch members for startingly turning the engine's shaft, one of said members being carried by said shaft; a wheel carried by the other clutch member; a flexible element rotatingly engaging the wheel; a spring connected to said element and adapted to draw the same in the direction to startingly turn the engine's shaft; a movable ratchet-toothed member connected to the spring; movable means provided with a releasable pawl adapted to engage the teeth of the ratchet-toothed member to tension the spring by the movement of said movable means; and a second spring mounted in fixed relation to the mounting of said movable means adapted to press the pawl into operative engagement with the ratchet teeth in one position of said movable means and to press the pawl out of such engagement in another position of said movable means.

In testimony whereof I have hereunto set my hand at Grand Rapids, Michigan, this 1st day of March, 1918.

HARRY A. YEIDER.